(12) United States Patent
Sakurai et al.

(10) Patent No.: US 11,360,873 B2
(45) Date of Patent: Jun. 14, 2022

(54) EVALUATION DEVICE, EVALUATION METHOD, AND EVALUATION PROGRAM

(71) Applicants: Kabushiki Kaisha Toshiba, Minato-ku (JP); Toshiba Digital Solutions Corporation, Kawasaki (JP)

(72) Inventors: Shigeaki Sakurai, Yokohama (JP); Minoru Nishizawa, Itabashi (JP); Shigeru Matsumoto, Nishitokyo (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 883 days.

(21) Appl. No.: 15/695,694

(22) Filed: Sep. 5, 2017

(65) Prior Publication Data
US 2018/0067834 A1 Mar. 8, 2018

(30) Foreign Application Priority Data
Sep. 6, 2016 (JP) .............................. JP2016-173810

(51) Int. Cl.
*G06F 11/34* (2006.01)
*G06F 11/30* (2006.01)
(Continued)

(52) U.S. Cl.
CPC ........ *G06F 11/3409* (2013.01); *G05B 23/021* (2013.01); *G06F 11/3058* (2013.01);
(Continued)

(58) Field of Classification Search
CPC ............... G05B 23/021; G06F 11/3058; G06F 11/3062; G06F 11/3409; G06F 11/3447; G06F 17/18; G06F 2201/81; G06N 20/00
See application file for complete search history.

(56) References Cited

U.S. PATENT DOCUMENTS

2009/0217099 A1 8/2009 Kato
2012/0191442 A1 7/2012 Hasegawa
(Continued)

FOREIGN PATENT DOCUMENTS

JP 2009-199533 9/2009
JP 2010-92203 4/2010
(Continued)

OTHER PUBLICATIONS

Jianbo Yu ("Hidden Markov models combining local and global information for nonlinear and multimodal process monitoring", Journal of Process Control 20, 2010, pp. 344-359) (Year: 2010).*
(Continued)

*Primary Examiner* — Miranda M Huang
*Assistant Examiner* — Robert Lewis Kulp
(74) *Attorney, Agent, or Firm* — Oblon, McClelland, Maier & Neustadt, L.L.P.

(57) ABSTRACT

An evaluation device of an embodiment includes a storage, a data generator, a class definer, a characteristic data divider, and an evaluator. The data generator is configured to generate a set of characteristic data from both a set of first data and at least a set of second data, the at least set of second data being associated in time information with the set of first data, the set of characteristic data representing a plurality of characteristics. The characteristic data divider is configured to divide the plurality of sets of characteristic data into a plurality of groups on the basis of the plurality of classes defined by the class definer and condition of operations included in the set of first data. The evaluator is configured to evaluate a operating state using a first model defined for each of the plurality of groups divided by the characteristic data divider.

7 Claims, 17 Drawing Sheets

(51) Int. Cl.
*G06F 17/18* (2006.01)
*G05B 23/02* (2006.01)
*G06N 20/00* (2019.01)
(52) U.S. Cl.
CPC ...... *G06F 11/3062* (2013.01); *G06F 11/3447* (2013.01); *G06F 17/18* (2013.01); *G06F 2201/81* (2013.01); *G06N 20/00* (2019.01)

(56) References Cited

U.S. PATENT DOCUMENTS

| 2012/0290879 | A1* | 11/2012 | Shibuya | G05B 23/021 714/26 |
|---|---|---|---|---|
| 2012/0323834 | A1 | 12/2012 | Fujimaki | |
| 2013/0103624 | A1* | 4/2013 | Thieberger | G06N 5/046 706/12 |
| 2013/0211801 | A1 | 8/2013 | Fujimaki et al. | |

FOREIGN PATENT DOCUMENTS

| JP | 2010-170422 | 8/2010 |
|---|---|---|
| JP | 2011-70635 | 4/2011 |
| JP | 4872944 | 2/2012 |
| JP | 5332647 | 11/2013 |
| JP | 5387779 | 1/2014 |
| JP | 5403456 | 1/2014 |
| JP | 5431235 | 3/2014 |
| JP | 5704162 | 4/2015 |
| WO | WO 2011/108632 A1 | 9/2011 |
| WO | WO 2012/029500 A1 | 3/2012 |
| WO | WO 2012/128207 A1 | 9/2012 |

OTHER PUBLICATIONS

Baraldi et al. ("Robust signal reconstruction for condition monitoring of industrial components via a modified Auto Associative Kernel Regression method", Mechanical Systems and Signal Processing 60-61 2015, pp. 29-44) (Year: 2015).*

Radhakrishnan et al. ("A Comparison between Polynomial and Locally Weighted Regression from Fault Detection and Diagnosis of HVAC Equipment", IECON 2006—32nd Annual Conference on IEEE Industrial Electronics, IEEE, 2006, pp. 3668-3673) (Year: 2006).*

Kazutaka Umayahara "Research on regularization and linear structure discovery in fuzzy clustering", 1999, 124 pages (with English Abstract).

Ron Kohavi, et al. "Decision Tree Discovery", 1999, 16 pages.

Tim Salimans, et al. "Improved Techniques for Training GANs", 2016, 10 pages.

* cited by examiner

FIG. 2

| OPERATION DATA ID | START TIME | END TIME | OPERATION LABEL DATA ||||||
|---|---|---|---|---|---|---|---|
| | | | PROCESS NAME | PROCESS TIME ZONE | PROCESS METHOD | PROCESS GRANULARITY | FREQUENCY OF PROCESS |
| DA01 | 9:00:00 | 9:25:00 | PROCESS 1 | 0:25:00 | AUTOMATIC | COARSE | LOW |
| DA02 | 9:25:00 | 9:45:00 | PROCESS 2 | 0:20:00 | AUTOMATIC | MEDIUM | MIDDLE |
| DA03 | 9:45:00 | 9:48:00 | PROCESS 3 | 0:03:00 | MANUAL | FINE | MIDDLE |
| ... | | | | | | | |

FIG. 3

| STATE DATA ID | MEASURING TIME | STATE LABEL DATA ||||
|---|---|---|---|---|---|
| | | TEMPERATURE OF PART 1 [°C] | TEMPERATURE OF PART 2 [°C] | FREQUENCY [Hz] | POWER [W] |
| DB01 | 9:00:00 | 10.0 | 11.0 | 100.0 | 50.0 |
| DB02 | 9:01:00 | 10.0 | 12.0 | 110.0 | 52.0 |
| ⋮ | | | ⋮ | | |
| DB25 | 9:24:00 | 12.0 | 20.0 | 200.0 | 70.0 |
| DB26 | 9:25:00 | 12.0 | 21.0 | 205.0 | 72.0 |
| DB27 | 9:26:00 | 11.0 | 18.0 | 100.0 | 60.0 |
| DB28 | 9:27:00 | 10.0 | 15.0 | 100.0 | 55.0 |
| ⋮ | | | ⋮ | | |
| DB45 | 9:44:00 | 12.0 | 13.0 | 130.0 | 62.0 |
| DB46 | 9:45:00 | 11.0 | 12.0 | 120.0 | 58.0 |
| DB47 | 9:46:00 | 10.0 | 12.0 | 40.0 | 21.0 |
| DB48 | 9:47:00 | 9.0 | 11.0 | 30.0 | 16.0 |
| DB49 | 9:48:00 | 10.0 | 12.0 | 35.0 | 17.0 |
| ⋮ | | | ⋮ | | |

FIG. 5

| ASSOCIATION DATA ID | OPERATION DATA ID | START TIME | END TIME | OPERATION LABEL DATA ||||| STATE DATA ID | MEASURING TIME | STATE LABEL DATA ||||
|---|---|---|---|---|---|---|---|---|---|---|---|---|---|---|
| | | | | PROCESS NAME | PROCESS TIME ZONE | PROCESS METHOD | PROCESS GRANULARITY | FREQUENCY OF PROCESS | | | TEMPERATURE OF PART 1 [°C] | TEMPERATURE OF PART 2 [°C] | FREQUENCY [Hz] | POWER [W] |
| DC01 | DA01 | 9:00:00 | 9:25:00 | PROCESS 1 | 0:25:00 | AUTOMATIC | COARSE | LOW | DB01 | 9:00:00 | 10 | 11 | 100 | 50 |
| DC02 | | | | | | | | | DB02 | 9:01:00 | 10 | 12 | 110 | 52 |
| ... | | | | | | | | | | | | | | |
| DC25 | DA02 | 9:25:00 | 9:45:00 | PROCESS 2 | 0:20:00 | AUTOMATIC | MEDIUM | MIDDLE | DB25 | 9:24:00 | 12 | 20 | 200 | 70 |
| DC26 | | | | | | | | | DB26 | 9:25:00 | 12 | 21 | 205 | 72 |
| DC27 | | | | | | | | | DB27 | 9:26:00 | 11 | 18 | 100 | 60 |
| DC28 | | | | | | | | | DB28 | 9:27:00 | 10 | 15 | 100 | 55 |
| ... | | | | | | | | | | | | | | |
| DC45 | DA03 | 9:45:00 | 9:48:00 | PROCESS 3 | 0:03:00 | MANUAL | FINE | MIDDLE | DB45 | 9:44:00 | 12 | 13 | 130 | 62 |
| DC46 | | | | | | | | | DB46 | 9:45:00 | 11 | 12 | 120 | 58 |
| DC47 | | | | | | | | | DB47 | 9:46:00 | 10 | 12 | 40 | 21 |
| DC48 | | | | | | | | | DB48 | 9:47:00 | 9 | 11 | 30 | 16 |
| DC49 | | | | | | | | | DB49 | 9:48:00 | 10 | 12 | 35 | 17 |
| ... | | | | | | | | | | | | | | |

FIG. 6

| CHARAC-TERISTIC DATA ID | OPERATION DATA ID | CHARACTERISTIC LABEL DATA ||||||||||
|---|---|---|---|---|---|---|---|---|---|---|---|
| | | AVERAGE TEMPERATURE OF PART 1 [°C] | MAXIMUM TEMPERATURE OF PART 1 [°C] | MINIMUM TEMPERATURE OF PART 1 [°C] | AVERAGE TEMPERATURE OF PART 2 [°C] | MAXIMUM TEMPERATURE OF PART 2 [°C] | MINIMUM TEMPERATURE OF PART 2 [°C] | AVERAGE FREQUENCY [Hz] | MAXIMUM FREQUENCY [Hz] | MINIMUM FREQUENCY [Hz] | AVERAGE POWER [W] | MAXIMUM POWER [W] | MINIMUM POWER [W] |
| DD01 | DA01 | 10.7 | 12.0 | 10.0 | 14.3 | 20.0 | 11.0 | 136.7 | 200.0 | 100.0 | 57.3 | 70.0 | 50.0 |
| DD02 | DA02 | 11.3 | 12.0 | 10.0 | 16.8 | 21.0 | 13.0 | 133.8 | 205.0 | 100.0 | 62.3 | 72.0 | 55.0 |
| DD03 | DA03 | 10.0 | 11.0 | 9.0 | 11.8 | 12.0 | 11.0 | 56.3 | 120.0 | 30.0 | 28.0 | 58.0 | 16.0 |
| ... | ... | | | | | | | | | | | | |

FIG. 11

| CONDITION (NODE LABEL DATA) | | | DIVIDED GROUPS OF SET OF CHARACTERISTIC DATA | CONFIDENCE |
|---|---|---|---|---|
| PROCESS METHOD: AUTOMATIC | PROCESS GRANULARITY: FINE | | DD05, DD22, DD16, ... | w1 |
| PROCESS METHOD: AUTOMATIC | PROCESS GRANULARITY: MEDIUM | FREQUENCY OF PROCESS: LOW | DD13, DD20, DD21, ... | w2 |
| PROCESS METHOD: AUTOMATIC | PROCESS GRANULARITY: MEDIUM | FREQUENCY OF PROCESS: MIDDLE | DD02, DD06, DD14, ... | w3 |
| PROCESS METHOD: AUTOMATIC | PROCESS GRANULARITY: MEDIUM | FREQUENCY OF PROCESS: HIGH; PROCESS TIME ZONE: SHORT | DD07, DD15, DD19, ... | w4 |
| PROCESS METHOD: AUTOMATIC | PROCESS GRANULARITY: MEDIUM | FREQUENCY OF PROCESS: HIGH; PROCESS TIME ZONE: LONG | DD08, DD12, DD17, ... | w5 |
| PROCESS METHOD: AUTOMATIC | PROCESS GRANULARITY: COARSE | | DD01, DD04, DD18, ... | w6 |
| PROCESS METHOD: MANUAL | PROCESS TIME ZONE: SHORT | | DD03, DD10, DD23, ... | w7 |
| PROCESS METHOD: MANUAL | PROCESS TIME ZONE: LONG | | DD09, DD11, ... | w8 |

FIG. 14

| OPERATION DATA ID | START TIME | END TIME | OPERATION LABEL DATA ||||| 
|---|---|---|---|---|---|---|---|
| | | | PROCESS NAME | PROCESS TIME ZONE | PROCESS METHOD | PROCESS GRANULARITY | FREQUENCY OF PROCESS |
| DE01 | 9:00:00 | 9:02:00 | PROCESS 1 | 0:02:00 | MANUAL | FINE | LOW |
| DE02 | 9:02:00 | 9:30:00 | PROCESS 2 | 0:28:00 | AUTOMATIC | COARSE | MIDDLE |

FIG. 15

| STATE DATA ID | MEASURING TIME | STATE LABEL DATA ||||
|---|---|---|---|---|---|
| | | TEMPERATURE OF PART 1 [°C] | TEMPERATURE OF PART 2 [°C] | FREQUENCY [Hz] | POWER [W] |
| DF01 | 9:00:00 | 12.0 | 11.0 | 70.0 | 16.0 |
| DF02 | 9:01:00 | 10.0 | 12.0 | 60.0 | 14.0 |
| DF03 | 9:02:00 | 10.0 | 8.0 | 90.0 | 32.0 |
| DF04 | 9:03:00 | 20.0 | 12.0 | 100.0 | 56.0 |
| ⋮ | | ⋮ | | | |
| DF30 | 9:29:00 | 23.0 | 15.0 | 85.0 | 16.0 |
| DF31 | 9:30:00 | 15.0 | 14.0 | 94.0 | 18.0 |

FIG. 16

| ASSOCIATION DATA ID | OPERATION DATA ID | START TIME | END TIME | OPERATION LABEL DATA ||||| STATE DATA ID | MEASURING TIME | STATE LABEL DATA ||||
|---|---|---|---|---|---|---|---|---|---|---|---|---|---|
| | | | | PROCESS NAME | PROCESS TIME ZONE | PROCESS METHOD | PROCESS GRANULARITY | FREQUENCY OF PROCESS | | | TEMPERATURE OF PART 1 [°C] | TEMPERATURE OF PART 2 [°C] | FREQUENCY [Hz] | POWER [W] |
| DG01 | DE01 | 9:00:00 | 9:02:00 | PROCESS 1 | 0:02:00 | MANUAL | FINE | LOW | DF01 | 9:00:00 | 12 | 11 | 70 | 16 |
| DG02 | | | | | | | | | DF02 | 9:01:00 | 10 | 12 | 60 | 14 |
| DG03 | DE02 | 9:02:00 | 9:30:00 | PROCESS 2 | 0:28:00 | AUTOMATIC | COARSE | MIDDLE | DF03 | 9:02:00 | 10 | 8 | 90 | 32 |
| DG04 | | | | | | | | | DF04 | 9:03:00 | 20 | 12 | 100 | 56 |
| ... | | | | | | | | | ... | ... | ... | ... | ... | ... |
| DG30 | | | | | | | | | DF30 | 9:29:00 | 23 | 15 | 85 | 16 |
| DG31 | | | | | | | | | DF31 | 9:30:00 | 15 | 14 | 94 | 18 |

FIG. 17

| CHARACTERISTIC DATA ID | OPERATION DATA ID | CHARACTERISTIC LABEL DATA | | | | | | | | | | |
|---|---|---|---|---|---|---|---|---|---|---|---|---|
| | | AVERAGE TEMPERATURE OF PART 1 [°C] | MAXIMUM TEMPERATURE OF PART 1 [°C] | MINIMUM TEMPERATURE OF PART 1 [°C] | AVERAGE TEMPERATURE OF PART 2 [°C] | MAXIMUM TEMPERATURE OF PART 2 [°C] | MINIMUM TEMPERATURE OF PART 2 [°C] | AVERAGE FREQUENCY [Hz] | MAXIMUM FREQUENCY [Hz] | MINIMUM FREQUENCY [Hz] | AVERAGE POWER [W] | MAXIMUM POWER [W] | MINIMUM POWER [W] |
| DH01 | DE01 | 11.0 | 12.0 | 10.0 | 11.5 | 12.0 | 11.0 | 65.0 | 70.0 | 60.0 | 15.0 | 16.0 | 14.0 |
| DH02 | DE02 | 17.0 | 23.0 | 10.0 | 12.3 | 15.0 | 8.0 | 92.3 | 100.0 | 85.0 | 30.5 | 56.0 | 16.0 |

EVALUATION DEVICE, EVALUATION METHOD, AND EVALUATION PROGRAM

CROSS-REFERENCE TO RELATED APPLICATIONS

This application is based upon and claims the benefit of priority from Japanese Patent Application No. 2016-173810, filed on Sep. 6, 2016; the entire contents of which are incorporated herein by reference.

FIELD

Embodiments described herein relate generally to an evaluation device, an evaluation method, and an evaluation program.

BACKGROUND

In a known method for detecting an abnormality or failure of a device to be evaluated, an evaluation model is prepared in advance and an abnormality of a device is detected by comparing a value calculated from the evaluation model with output data of the device. However, the conventional detection method may sometimes fail to accurately detect an abnormality or the like of the device since the evaluation model does not consider operating conditions or the like of the device in a combined manner.

BRIEF DESCRIPTION OF THE DRAWINGS

FIG. 2 is a diagram showing an example of operation data used in a learning stage of the embodiment.

FIG. 3 is a diagram showing an example of state data used in the learning stage of the embodiment.

FIG. 5 is a diagram showing an example of association data used in the learning stage of the embodiment.

FIG. 6 is a diagram showing an example of characteristic data used in the learning stage of the embodiment.

FIG. 11 is a diagram showing an example of characteristic data divided in the learning stage of the embodiment in tabular form.

FIG. 14 is a diagram showing an example of operation data used in the evaluation stage of the embodiment.

FIG. 15 is a diagram showing an example of state data used in the evaluation stage of the embodiment.

FIG. 16 is a diagram showing an example of association data used in the evaluation stage of the embodiment.

FIG. 17 is a diagram showing an example of characteristic data used in the evaluation stage of the embodiment.

DETAILED DESCRIPTION

Hereinafter, an evaluation device, an evaluation method, and an evaluation program of an embodiment will be described with reference to the drawings.

According to at least one embodiment described above, an evaluation device of an embodiment includes a storage, a data generator, a class definer, a characteristic data divider, and an evaluator.

The storage stores a plurality of sets of first data collected for each operation of an evaluation target, each of the set of first data having a time width. The storage stores a plurality of sets of second data including a measured values of the evaluation target obtained by measuring operating states thereof, each of the set of second data being measured within a time width shorter than the time width of the set of first data;

The data generator is configured to generate a set of characteristic data from both a set of first data and at least a set of second data, the set of first data being included in the plurality of sets of first data, the at least set of second data being associated in time information with the set of first data, the at least set of second data being included in the plurality of sets of second data, the set of characteristic data representing a plurality of characteristics;

The class definer is configured to define a plurality of classes for the plurality of sets of characteristic data generated by the data generator;

The characteristic data divider configured to divide the plurality of sets of characteristic data into a plurality of groups on the basis of the plurality of classes defined by the class definer and condition of operations included in the set of first data stored in the storage; and The evaluator is configured to evaluate a operating state of the evaluation target using a first model defined for each of the plurality of groups divided by the characteristic data divider.

Figure 1:
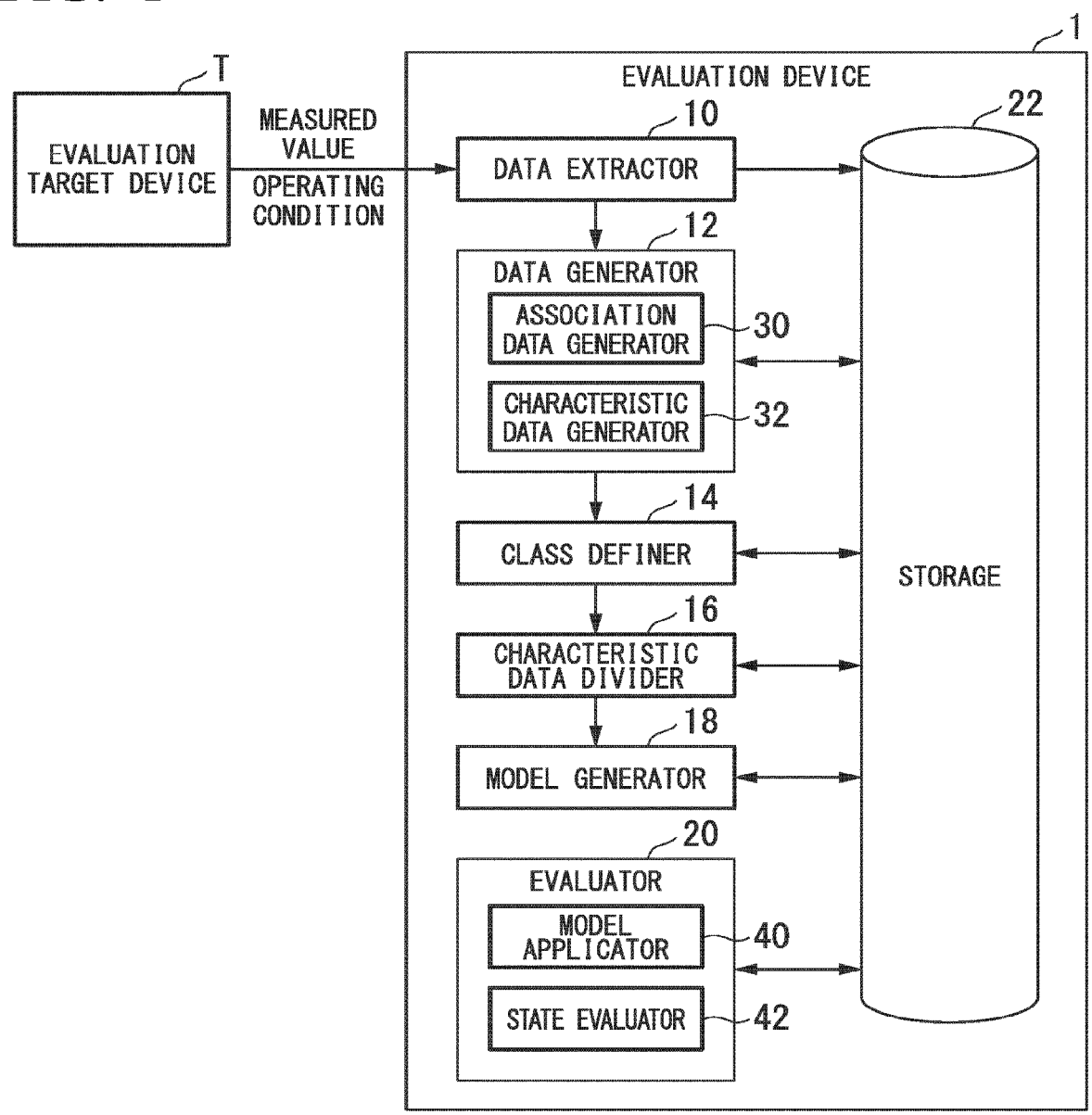
FIG. 1 is a functional block diagram showing an example of an evaluation device according to an embodiment.

FIG. 1 is a functional block diagram showing an example of the evaluation device of the embodiment. The evaluation device 1 is a device that evaluates an abnormality, a failure, and other operating states of an evaluation target device T on the basis of various data (operating conditions, measured values, or the like) extracted from the evaluation target device T. The evaluation device 1 includes, for example, a data extractor 10, a data generator 12, a class definer 14, a characteristic data divider 16, a model generator 18, an evaluator 20, and a storage 22.

The data extractor 10 extracts various data from the evaluation target device T and stores the extracted various data in the storage 22. For example, the data extractor 10 extracts various data from various sensors attached to the evaluation target device T. Further, the data extractor 10 may also extract various data (status logs) output from a control computer provided for the evaluation target device T. The data extractor 10 generates operation data (which is an example of first data) and state data (which is an example of second data) on the basis of the various data extracted from the evaluation target device T. The data extractor 10 stores the generated operation and state data in the storage 22. In the case in which the evaluation target device T outputs data in operation data format and a state data format, the data extractor 10 may allow the storage 22 to store the data extracted from the evaluation target device T without processing the data.

The term "operation data" refers to, for example, data which indicates content of operations corresponding to conditions of process, respective process of the evaluation target device T. The operation data has time widths. For example, the operation data is as shown in FIG. 2. FIG. 2 shows an example in which each set of the operation data includes a "operation data ID," a "start time," an "end time," and "operation label data." The "operation data ID" is an identifier of the set of operation data. The "start time" is information indicating the time at which each operation starts. The "end time" is information indicating the time at which each operation ends. The "operation label data" is information indicating characteristics (for example, the respective content of operations) related to operation by the evaluation target device T.

In the example shown in FIG. 2, the "operation label data" include a "process name," a "process time zone," a "process method," a "process granularity," and a "frequency of process." Process is respective operation by the target device T. The "process name" is information indicating the name of each process. The "process time zone" is information indicating the time width of each process. The "process method" is information indicating whether each process is performed automatically or manually. The "process granularity" is information indicating the degree of precision of each process. The "frequency of process" is information indicating a frequency with which each operation is performed within the above "process time zone." For example, a set of operation data whose operation data ID is "DA01" starts an operation of process 1 (which corresponds to the "process name") at 9:00:00 (which corresponds to the "start time") and ends at 9:25:00 (which corresponds to the "end time") to perform the operation for a total of 25 minutes (which corresponds to the "process time zone"). In addition, the operation of process 1 is performed automatically (which corresponds to the "process method") with "coarse/large" precision (which corresponds to the "process granularity") with a low frequency (which corresponds to the "frequency of process").

The data extractor 10 stores a plurality of sets of operation data identified by "operation data IDs" in the storage 22 in time series. Here, in the "operation label data," some of the "process name," the "process time zone," the "process method," the "process granularity," and the "frequency of process" may be omitted. In the "operation label data," may be included in addition to (or instead of) them, for example characteristics related to the operation of evaluation target device T.

The term "state data" refers to, data which indicates various measured values obtained by measuring states of the evaluation target device T. The state data has finer time widths (for example, instantaneous values) than time width of the set of operation data. For example, the state data is as shown in FIG. 3. FIG. 3 shows an example in which each set of the state data includes a "state data ID," a "measuring time," and "state label data." The "state data ID" is an identifier of the set of state data. The "measuring time" indicates the time at which each set of state data is generated. The "state label data" indicates characteristics (for example, various measured values) related to state of the evaluation target device T at a specific measuring time.

In the example shown in FIG. 3, each set of the "state label data" includes a "temperature of part 1," a "temperature of part 2," a "frequency," and "power." The "temperature of part 1" is information indicating the temperature of a part 1 included in the evaluation target device T. The "temperature of part 2" is information indicating the temperature of a part 2 included in the evaluation target device T. The "frequency" indicates the operating frequency of the evaluation target device T. The "power" is information indicating power consumption of the evaluation target device T. For example, a set of state data whose "state data ID" is "DB01" includes 9:00:00 as the time when temperatures of part 1 and part 2 are measured (which corresponds to the "measuring time"), 10.0° C. as the measured temperature of the part 1 (which corresponds to the "temperature of part 1"), 11.0° C. as the measured temperature of the part 2 (which corresponds to the "temperature of part 2"), a frequency of 100.0 Hz (which corresponds to the "frequency"), and a power of 50.0 W (which corresponds to the "power").

The data extractor 10 stores a plurality of sets of state data identified by "state data IDs" in the storage 22 in time series. In the "state label data," some of the "temperature of part 1," the "temperature of part 2," the "frequency," and the "power," and may also include other characteristics related to state of the evaluation target device T may be included in addition to (or instead of) them.

The data generator 12 generates association data and characteristic data by the operation data and the state data stored in the storage 22. The data generator 12 includes, for example, an association data generator 30 that generates association data, and a characteristic data generator 32 that generates characteristic data. The term "association data" refers to, data which associates operation data and state data with each other on the basis of time information. For example, the association data associates a set of state data whose "measuring time" including in "process time zone" of a set of operation data. The term "characteristic data" refers to data including various amount of characteristic generated on the basis of the association data. The amount of characteristic is related to state of evaluation target device T. Details of the association data and the characteristic data generated by the data generator 12 will be described later.

The class definer 14 defines groups of the similar set of characteristics data as same classes.

For example, the class definer 14 defines a first plurality of classes of the characteristic data on the basis of characteristic label data included in the set of characteristic data. For example, the class definer 14 may generate a plurality of vectors, wherein each of the plurality of vectors is represented by a respective set of the plurality of sets of characteristic label data. The class definer 14 defines Ln norms (n=1, 2, . . . ) as the distances between any combinations of the plurality of vectors. The class definer 14 may define the first plurality of classes on the basis at least in part on at least one of the distances between the combinations of the plurality of vectors, wherein each class of the first plurality of classes is to be allocated to at least a respective set of the plurality of sets of characteristic data. The class definer 14 may also define the first plurality of classes of the characteristic data by applying an arbitrary method such as clustering.

The characteristic data divider 16 divides the set of the characteristic data into a plurality of groups. The group is such that the group of a plurality of sets of characteristic data defined as same class. For example, the characteristic data divider 16 models relationships between combinations of labels included in the operation data and the classes defined by the class definer 14. The characteristic data divider 16 applies the characteristic data to this model to divide the set of the characteristic data into a plurality of subsets of the characteristic data. The characteristic data divider 16 generates a plurality of divided groups of set of characteristic data (hereinafter also referred to as a "the plurality of divided groups of characteristic data").

The model generator 18 defines a conditional model (which is an example of a first model) for each of the divided groups of the set of characteristic data. The conditional model represents a relationship between the set of characteristic data. Further, the model generator 18 defines one overall model (which is an example of a second model) for all the set of characteristic data.

The evaluator 20 evaluates an abnormality, a failure, and other operating states of the evaluation target device T using the conditional models and the overall model. The evaluator 20 includes, for example, a model applicator 40 and a state evaluator 42. The model applicator 40 applies the conditional models and the overall model to data extracted from the evaluation target device T. The state evaluator 42 evaluates a state of the evaluation target device T. The evaluator 20 may display the evaluation result of the state evaluator 42 on a display (not shown).

All or some of the functional units of the above-described evaluation device 1 may be realized by a processor executing a program (software). All or some of the functional units of the evaluation device 1 may also be realized by hardware such as large-scale integration (LSI), an application specific integrated circuit (ASIC), or a field-programmable gate array (FPGA) or may be realized by a combination of software and hardware.

The operation of the evaluation device 1 includes a learning stage and an evaluation stage. The learning stage is learning operations of the evaluation target device T (for example, data thereof in normal operation) on the basis of various data extracted from the evaluation target device T, and to generate conditional models and an overall model. The evaluation stage is evaluating an operating state by the evaluation target device T on the basis of various data extracted from the evaluation target device T. The learning stage and the evaluation stage are described below.

Figure 4:
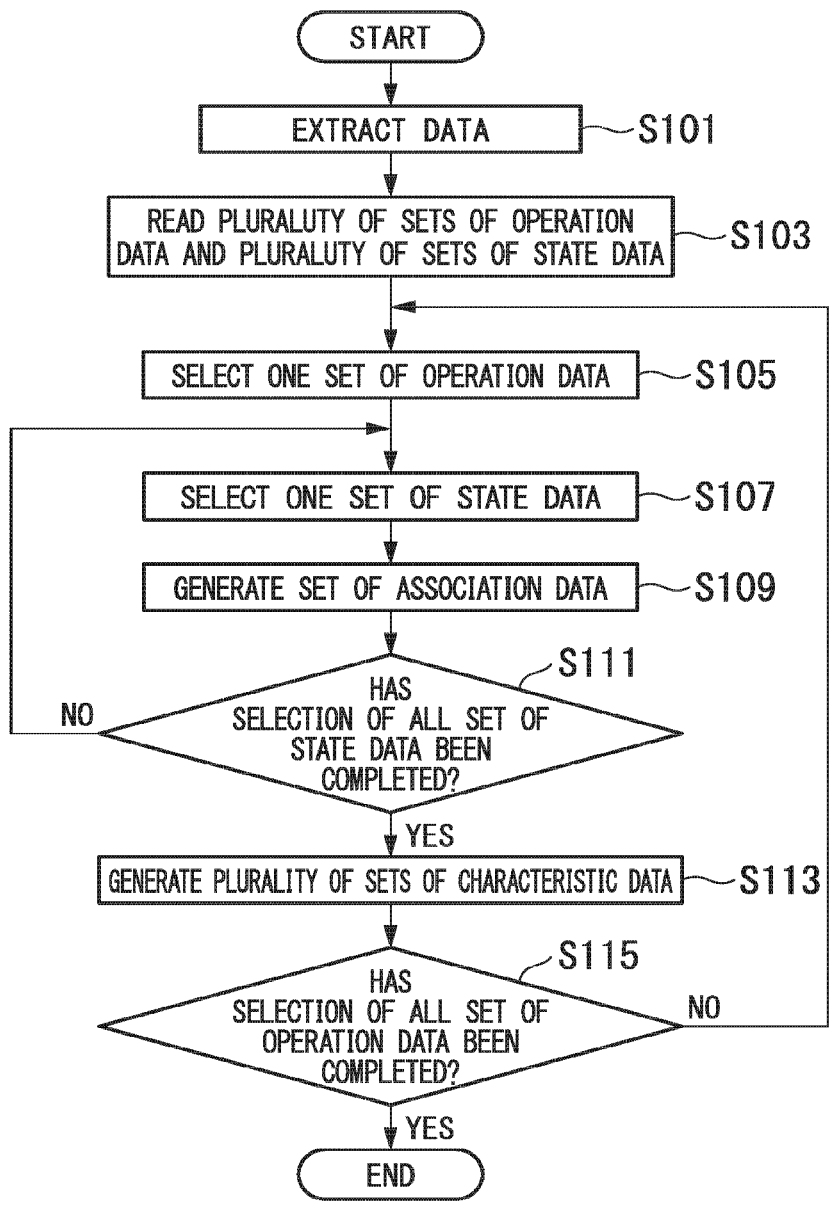
FIG. 4 is a flowchart showing an example of a process of generating characteristic data in the learning stage of the embodiment.

FIG. 4 is a flowchart showing an example of a procedure for generating characteristic data in the learning stage of the embodiment. First, the data extractor 10 extracts various data (operation conditions, measured values, or the like) from the evaluation target device T and stores the extracted data in the storage 22. For example, the data extractor 10 generates a plurality of sets of operation data as shown in FIG. 2 and a plurality of sets of state data as shown in FIG. 3 from the various data extracted from the evaluation target device T and stores the generated data in the storage 22 (step S101).

Next, the association data generator 30 reads the plurality of sets of operation data and the plurality of sets of state data from the storage 22 (step S103). The association data generator 30 may directly receive the plurality of sets of operation data and the plurality of sets of state data from the data extractor 10.

Next, the association data generator 30 selects one set of operation data from the read plurality of sets of operation data (step S105). For example, the association data generator 30 selects a set of operation data having the earliest "start time" from the read plurality of sets of operation data. In the example of the plurality of sets operation data shown in FIG. 2, when this process is executed first, a set of operation data with a operation data ID "DA01" is selected.

Next, the association data generator 30 selects, from the read plurality of sets of state data, one set of state data which is within a time range equal to or later than the start time and earlier than the end time of the set of operation data selected prior to this process (step S107). A set of state data with a state data ID "DB01" is selected in the case in which the plurality of sets of state data shown in FIG. 3 is read and the set of operation data with the operation data ID "DA01" is selected prior to this process.

Next, the association data generator 30 generates set of association data by associating the selected set of operation data with the selected set of state data, and the association data generator 30 allows the storage 22 to store the set of association data (step S109). For example, as shown in FIG. 5, the "measuring time" of each of the 25 sets of state data whose state data IDs are "DB01" to "DB25" is equal to or later than the "start time" (9:00:00) of the set of operation data whose operation data ID is "DA01" and earlier than the "end time" (9:25:00) thereof. Therefore, the association data generator 30 generates the plurality of sets of association data by associating the set of operation data whose operation data ID is "DA01" with each of the 25 sets of state data whose state data IDs are "DB01" to "DB25." The set of association data also includes "association data IDs" which are identifiers of the set of association data. For example, an association data ID "DC01" is assigned to a set of association data in which the set of operation data with the operation data ID "DA01" is associated with the set of state data with the state data ID "DB01."

Next, the association data generator 30 determines whether or not selection of the plurality of set of state data, which are in the time range equal to or later than the start time and earlier than the end time of the set of operation data selected prior to this process, has been completed (step S111).

For example, in the case in which the set of operation data with the operation data ID "DA01" has been selected and the set of state data with the state data ID "DB01" has been selected, selection of the plurality of sets of state data with the state data ID "DB02" and subsequent has not yet been completed. In this case, the association data generator 30 determines that selection of the plurality of sets of state data has not been completed and performs the process of selecting each set of state data (step S107) for the plurality of sets of state data with the state data ID "DB02" and subsequent. On the other hand, in the case in which the set of operation data with the operation data ID "DA01" has been selected and the set of state data with the state data ID "DB25" has been selected, there is no set of state data which has not yet been selected among those which are in the time range equal to or later than the start time and earlier than the end time of the set of operation data. In this case, the association data generator 30 determines that selection of the set of state data has been completed.

Next, the characteristic data generator 32 generates characteristic data including a plurality of features characterizing operating state by the evaluation target device T, on the basis of the plurality of sets of association data generated by the association data generator 30. The plurality of sets of association data generated for the single set of operation data (step S113). For example, as shown in FIG. 6, a single set of characteristic data is generated from the 25 sets of association data generated by associating the set of operation data whose "operation data ID" is "DA01" with each of the 25 sets of state data whose "state data IDs" are "DB01" to "DB25." FIG. 6 shows an example in which each set of characteristic data includes a "characteristic data ID," a "operation data ID," and "characteristic label data". The characteristic label data includes an "average temperature of part 1," a "maximum temperature of part 1," a "minimum temperature of part 1," an "average temperature of part 2," a "maximum temperature of part 2," a "minimum temperature of part 2," an "average frequency," a "maximum frequency," a "minimum frequency," an "average power," a "maximum power," and a "minimum power." The "characteristic data ID" is an identifier of the set of characteristic data. For example, the "average temperature of part 1," the "maximum temperature of part 1" and the "minimum temperature of part 1" correspond respectively to an average temperature, a maximum temperature, and a minimum temperature of the "temperature of part 1" of the 25 sets of state data whose state data IDs are "DB01" to "DB25." That is, the set of characteristic data includes the plurality of sets of characteristic label data which represent measured values of the evaluation target device T by vectors. In the present embodiment, amount of characteristic of the operating state by the evaluation target device T are calculated by individually referring to respectively characteristic label data, but the calculated amount of characteristic, each combining the plurality of characteristic label data, may also be generated. It is also possible to calculate amount of characteristic based on the operation label data of the set of operation data or to calculate amount of characteristic by reflecting the operation label data of the set of operation data in state label data of the set of state data.

Next, the characteristic data generator 32 determines whether or not selection of all set of operation data has been completed (step S115). For example, in the case in which the set of operation data with the operation data ID "DA01" has been selected, selection of the plurality of sets of operation data with the operation data ID "DA02" and subsequent has not yet been completed. In this case, the characteristic data generator 32 determines that selection of the operation data has not been completed and performs the process of selecting the set of operation data (step S105) for the plurality of sets of operation data with the operation data ID "DA02" and subsequent. On the other hand, when all set of operation data have been selected, the characteristic data generator 32 determines that selection of the set of operation data has been completed and ends the procedure of this flowchart.

Figure 7:
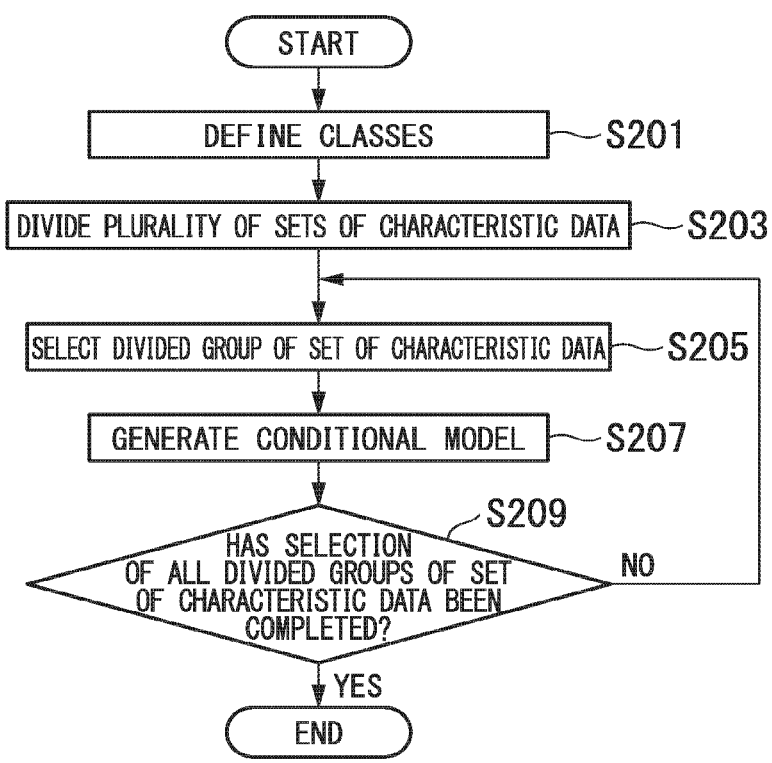
FIG. 7 is a flowchart showing an example of a process of generating conditional models in the learning stage of the embodiment.

In the learning stage, a process of generating conditional models is performed subsequent to the process of generating the characteristic data. FIG. 7 is a flowchart showing an example of a process of generating conditional models in the learning stage of the embodiment.

Figure 8:
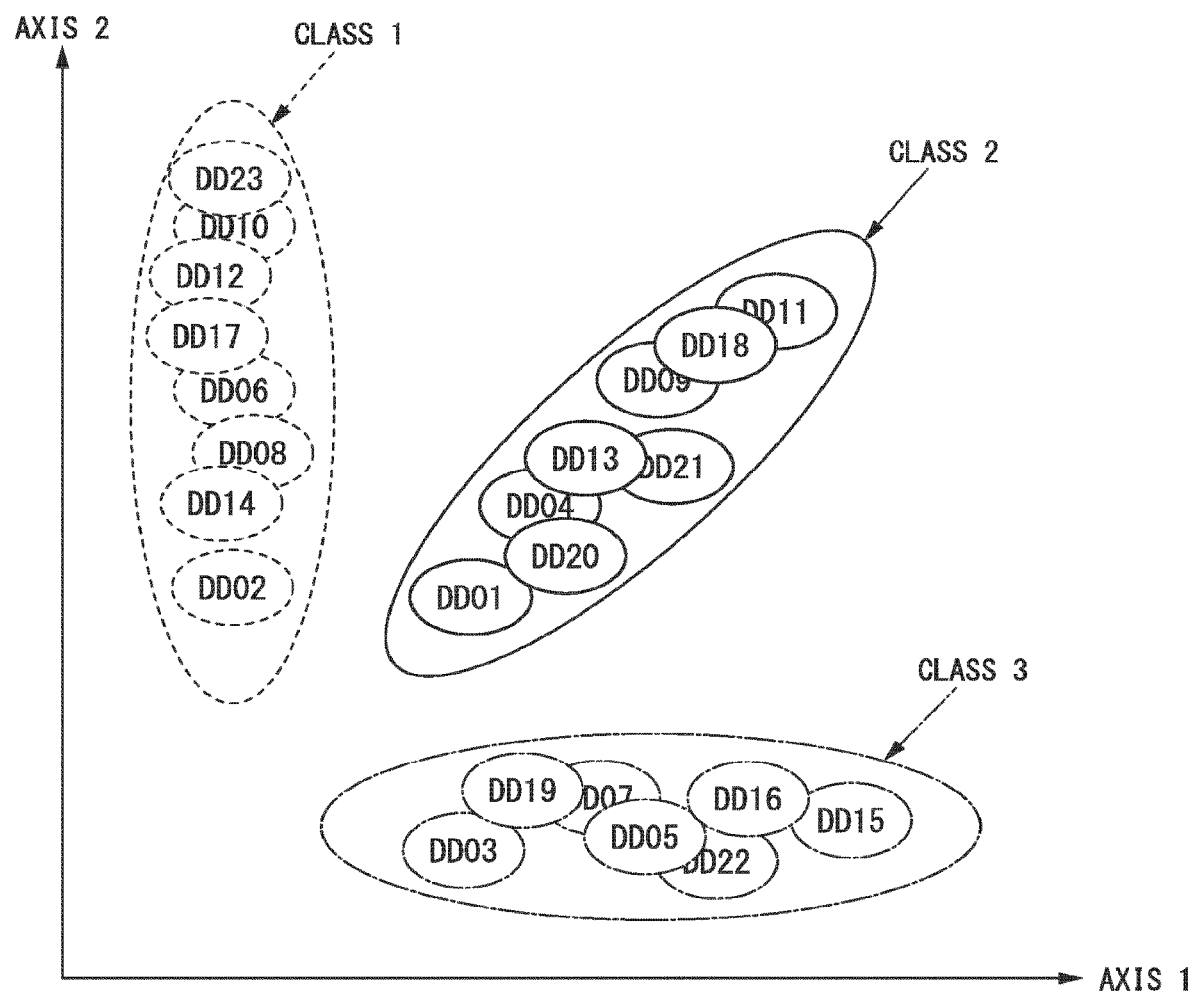
FIG. 8 is a diagram showing an example of classes of characteristic data defined in the learning stage of the embodiment.

First, the class definer 14 defines, as classes, clusters generated by clustering set of characteristic data. The class definer 14 divides the plurality of sets of characteristic data into a plurality of clusters in order to gather set of characteristic data having similar amount of characteristic clustering to same class (step S201). When the characteristic data is clustered, a linear clustering method may be used to generate clusters with a linear structure. FIG. 8 is a diagram showing an example of a class definition of characteristic data of the embodiment. FIG. 8 shows how similar set of characteristic data is collected in each of three clusters (class 1, class 2, and class 3) by clustering. Axis 1 and axis 2 indicate features, each formed by combining the plurality of characteristic label data constituting the set of characteristic data. These axes may be generated, for example, as the first two principal components in the principal component analysis. The class definer 14 may also define fewer or more than three classes.

Next, the characteristic data divider 16 models relationships between combinations of operation label data included in the set of operation data and the classes generated by the class definer 14. The characteristic data divider 16 applies the plurality of sets of characteristic data to this model to divide the set of characteristic data into a plurality of subsets of the set of characteristic data, thus generating a plurality of divided groups of set of characteristic data (step S203). For example, a decision tree generation algorithm may be used to model the relationships between combinations of operation label data and classes.

Figure 9:
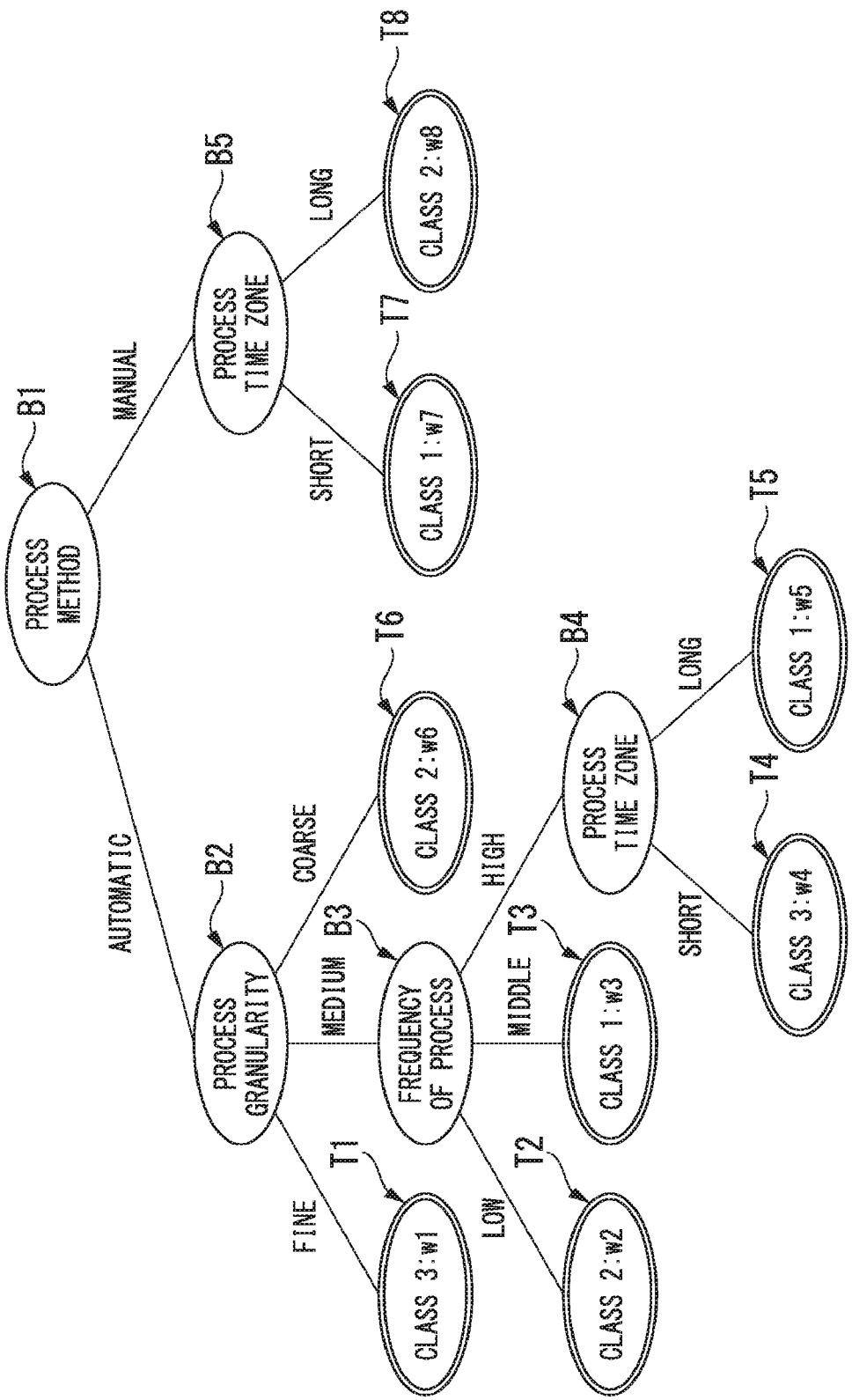
FIG. 9 is a diagram showing an example of a decision tree generated by a decision tree generation algorithm in the learning stage of the embodiment.

FIG. 9 shows an example of a decision tree generated by the decision tree generation algorithm when the classes shown in FIG. 8 are given for the set of characteristic data shown in FIG. 6. In FIG. 9, single-lined ellipses represent branch nodes, double-lined ellipses represent terminal nodes, and solid lines connecting the nodes represent branches. An operation label is assigned to each branch node, a degree of operation label data representing the operation label of a higher branch node is assigned to each branch, and a class is assigned to each terminal node. In addition to a class, a confidence is assigned to each terminal node in the decision tree shown in FIG. 9. The confidence is an occupation rate indicating the ratio of set of characteristic data classified into the class assigned to the terminal node in the plurality of sets of characteristic data propagated to the terminal node. That is, this confidence represents the probability of the class at the terminal node and indicates how much the set of characteristic data in same class is gathered at each terminal node. This confidence is 1 if all set of characteristic data collected in each terminal node belongs to the same class. This confidence is ⅓ if three classes are equally included in each terminal node.

Figure 10:
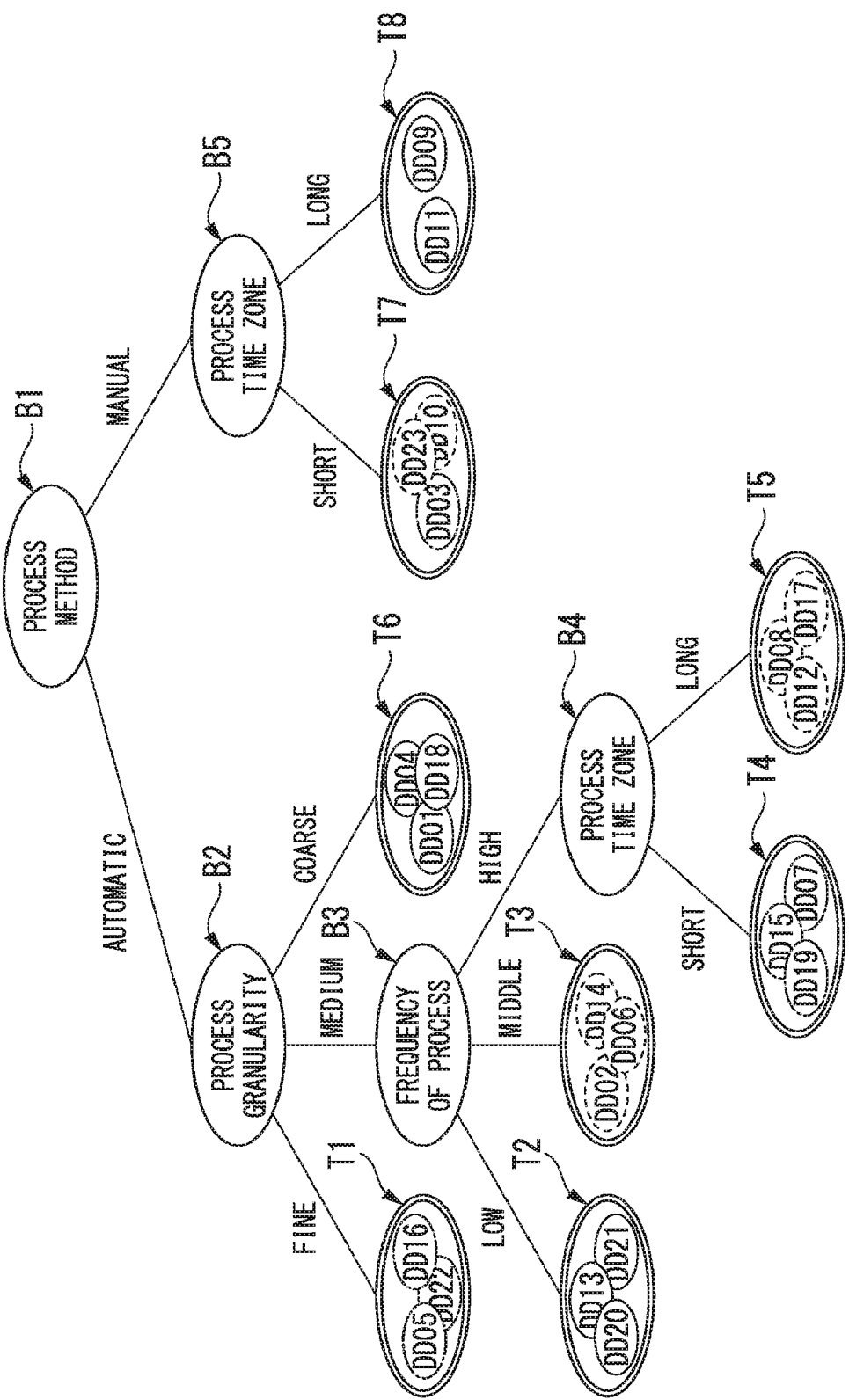
FIG. 10 is a diagram showing an example of a decision tree applied for dividing characteristic data in the learning stage of the embodiment.

In the case in which the set of characteristic data of FIG. 6 is applied to the decision tree shown in FIG. 9, the set of characteristic data is divided as shown in FIG. 10. The state of division of the set of characteristic data of FIG. 10 may be represented by a table structure as shown in FIG. 11. In FIG. 11, each row represents a "condition (node label data)", a "divided groups of set of characteristic data", and a "confidence". The condition (node label data) includes operation labels assigned to respectively branch nodes and degree of operation label data assigned to respectively, appearing on a path from the highest node to one terminal node in the decision tree of FIG. 9. The confidence includes a class and confidence of the terminal node. In the decision tree generation algorithm, division of the set of characteristic data is performed at the same time as when the decision tree is generated. Therefore, after the generation of the decision tree is completed, the set of characteristic data need not be applied again to perform division of the set of characteristic data.

Next, the model generator 18 selects one divided group of set of characteristic data from the divided groups of set of characteristic data (step S205). For example, one divided group of set of characteristic data is selected from the divided groups of set of characteristic data as shown in FIG. 11.

Next, the model generator 18 generates a conditional model corresponding to a condition (combination of a set of operation labels and degree of operation label data) of the selected divided group of the set of characteristic data on the basis of the selected divided group of the set of characteristic data and stores the generated conditional model in the storage 22 (step S207). For example, the model generator 18 selects one characteristic label within set of characteristic data from the divided group of set of characteristic data and generates a regression model having the selected characteristic label as an explained variable and the remaining characteristic labels as explanatory variables. The characteristic label to be selected is sequentially changed, thus generating the same number of regression models as the number of the characteristic labels. This set of regression models is a conditional model corresponding to the combination of conditions.

An example of a regression model of the ith characteristic label from the left of the set of characteristic data (FIG. 6), the combination of conditions in the first row of the table shown in FIG. 11, is represented by the following equation (1).

$$y_{1i} = b_{1i} + \sum_{j=1, j \neq i}^{n} a_{1ij} x_{1ij} \qquad \text{equation (1)}$$

In equation (1), $y_{1i}$ is an explained variable of the regression model of the ith characteristic label of the combination of conditions in the first row, $x_{1ij}$ ($i \neq j$) is an explanatory variable of a jth characteristic label of the regression model of the ith characteristic label of the combination of conditions in the first row, $b_{1i}$ is a constant term of the regression model of the ith characteristic label of the combination of conditions of the first row, $a_{1ij}$ ($i \neq j$) is a regression coefficient of the jth characteristic label of the regression model of the ith characteristic label of the combination of conditions in the first row, and n is the number of characteristic labels in the divided group of set of characteristic data.

An example of a regression model of the ith characteristic label from the left of the set of characteristic data (FIG. 6), the combination of conditions in the second row of the table shown in FIG. 11 is represented by the following equation (2).

$$y_{2i} = b_{2i} + \sum_{j=1, j \neq i}^{n} a_{2ij} x_{2ij} \qquad \text{equation (2)}$$

In equation (2), $y_{2i}$ is an explained variable of the regression model of the ith characteristic label of the combination of conditions in the second row, $x_{2ij}$ ($i \neq j$) is an explanatory variable of a jth characteristic label of the regression model of the ith characteristic label of the combination of conditions in the second row, $b_{2i}$ is a constant term of the regression model of the ith characteristic label of the combination of conditions of the second row, $a_{2ij}$ ($i \neq j$) is a regression coefficient of the jth characteristic label of the regression model of the ith characteristic label of the combination of conditions in the second row, and n is the number of characteristic labels in the divided group of set of characteristic data.

Next, the model generator 18 determines whether or not selection of the divided groups of set of characteristic data has been completed (step S209). Upon determining that selection of the divided groups of set of characteristic data has not been completed, the model generator 18 performs the process of selecting a divided group of set of characteristic data again (step S205). On the other hand, upon determining that selection of the divided groups of set of characteristic data has been completed, the model generator 18 ends the procedure of this flowchart.

Figure 12:
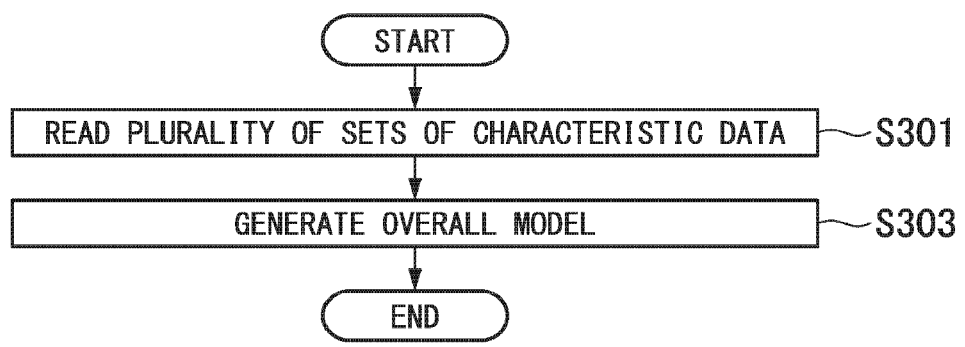
FIG. 12 is a flowchart showing an example of a process of generating an overall model in the learning stage of the embodiment.

In the learning stage of the present embodiment, separately from the above process of generating conditional models, an overall model considering no combinations of conditions is generated for all set of characteristic data. FIG. 12 is a flowchart showing an example of a process of generating an overall model in the learning stage of the embodiment.

First, the model generator 18 reads a plurality of sets of characteristic data from the storage 22 (step S301).

Next, the model generator 18 sequentially selects one characteristic label from the set of characteristic data to generate a regression model for each characteristic label and stores the generated regression model in the storage 22 (step S303).

An example of a regression model of the ith characteristic label considering no combinations of conditions is represented by the following equation (3).

$$y_{0i} = b_{0i} + \sum_{j=1, j \neq i}^{n} a_{0ij} x_{0ij} \qquad \text{equation (3)}$$

In equation (3), $y_{0i}$ is an explained variable of the regression model of the ith characteristic label considering no combinations of conditions, $x_{0ij}$ ($i \neq j$) is an explanatory variable of the jth characteristic label of the regression model of the ith characteristic label considering no combinations of conditions, $b_{0i}$ is a constant term of the regression model of the ith characteristic label considering no combinations of conditions, $a_{0ij}$ ($i \neq j$) is a regression coefficient of the jth characteristic label of the regression model of the ith characteristic label considering no combinations of conditions, and n is the number of characteristic labels in the set of characteristic data.

Through the above process, the learning stage of the evaluation target device T is completed. As a result, conditional models considering combinations of conditions and an overall model considering no combinations of conditions are generated.

Figure 13:
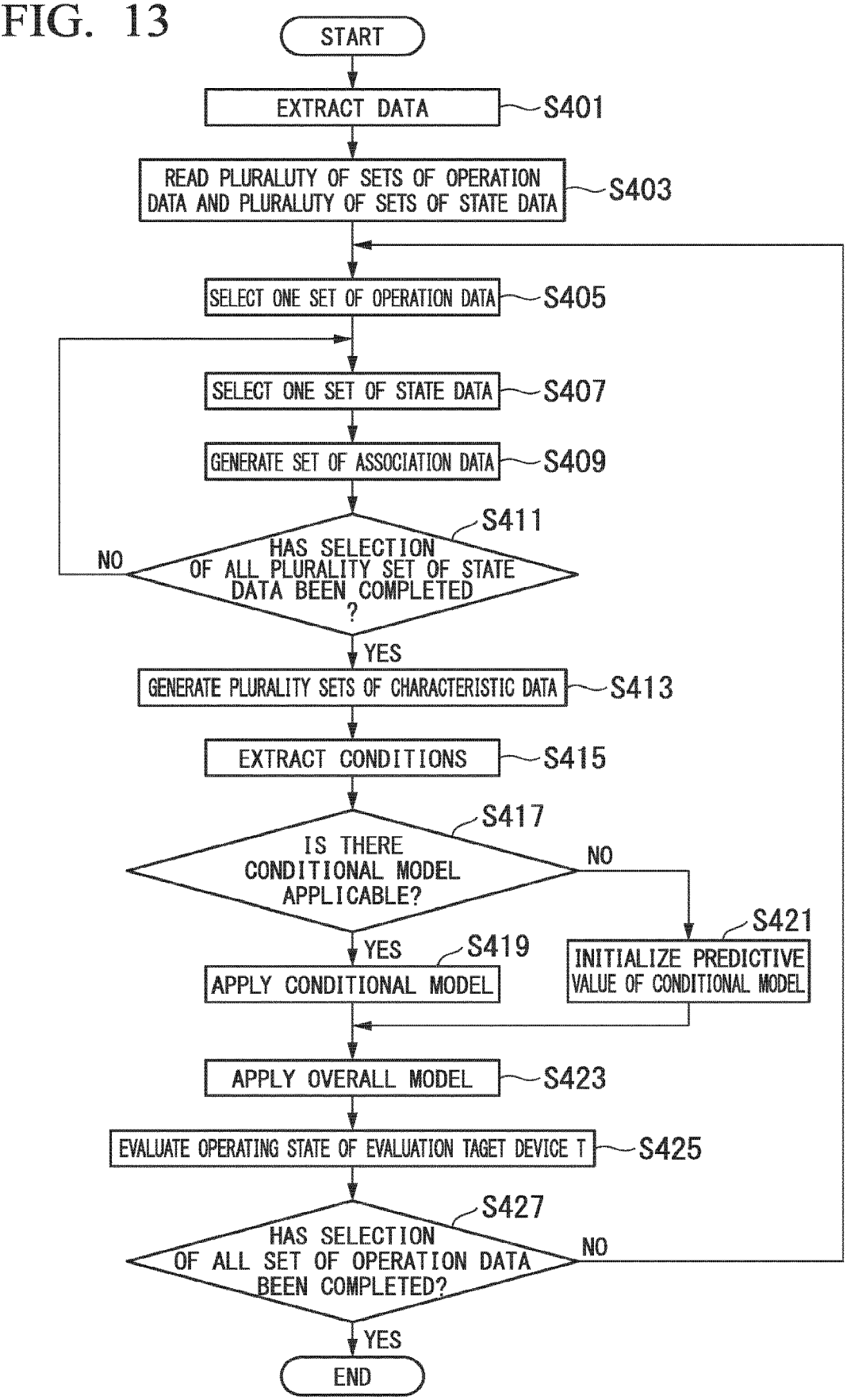
FIG. 13 is a flowchart showing an example of an evaluation process in an evaluation stage of the embodiment.

In the following, an evaluation stage in which the evaluation target device T is evaluated using the conditional models and the overall model generated in the above learning stage will be described. FIG. 13 is a flowchart showing an example of an evaluation process in the evaluation stage of the embodiment.

First, the data extractor 10 extracts various data from the evaluation target device T and stores the extracted data in the storage 22 (step S401). For example, the data extractor 10 generates a plurality of sets of operation data as shown in FIG. 14 and a plurality of sets of state data as shown in FIG. 15 from the various data extracted from the evaluation target device T and stores the generated plurality of sets of operation and the plurality of sets of state data in the storage 22.

Next, the association data generator 30 reads the plurality of sets of operation data and the plurality of sets of state data from the storage 22 (step S403). The association data generator 30 may directly receive the plurality of sets of operation data and the plurality of sets of state data from the data extractor 10.

Next, the association data generator 30 selects one set of operation data from the read plurality of sets of operation data (step S405). For example, the association data generator 30 selects a set of operation data having the earliest "start time" from the read plurality of sets of operation data. In the example of the plurality of sets of operation data shown in FIG. 14, when this process is executed first, data with a operation data ID "DE01" is selected.

Next, the association data generator 30 selects, from the read plurality of sets of state data, one set of state data which is within a time range equal to or later than the start time and earlier than the end time of the set of operation data selected prior to this process (step S407). A set of state data with a state data ID "DF01" is selected in the case in which the plurality of sets of state data shown in FIG. 15 is read and the set of operation data with the operation data ID "DE01" is selected prior to this process.

Next, the association data generator 30 generates a plurality of sets of association data by associating a selected set of operation data with a selected set of state data and allows the storage 22 to store the plurality of sets of association data (step S409). For example, as shown in FIG. 16, the association data generator 30 generates a set of association data (whose association data ID is "DG01") by associating the set of operation data whose operation data ID is "DE01" with the set of state data whose state data ID is "DF01."

Next, the association data generator 30 determines whether or not selection of the plurality of sets of state data, which are in the time range equal to or later than the start time and earlier than the end time of the set of operation data selected prior to this process, has been completed (step S411). Upon determining that selection of the plurality of sets of state data has not been completed, the association data generator 30 performs the process of selecting the set of state data again (step S407).

For example, when the association data generator 30 determines that selection of the plurality of sets of state data has been completed, the characteristic data generator 32 generates set of characteristic data including a plurality of features characterizing operating state of the evaluation target device T with regard to a plurality of sets of association data generated for the single set of operation data (step S413). For example, the characteristic data generator 32 generates a plurality of sets of characteristic data as shown in FIG. 17.

Next, the model applicator 40 extracts conditions by referring to the operation label data including in set of operation data related to the generated set of characteristic data (step S415). For example, as conditions, the operation label data of set of operation data with a operation data ID "DE01" are extracted for a set of characteristic data with a characteristic data ID "DH01" shown in FIG. 17. The extracted conditions are "process name: process 1," "process time zone: 0:02:00," "process method: manual," "process granularity: fine," and "frequency of process: low".

Figure 18:
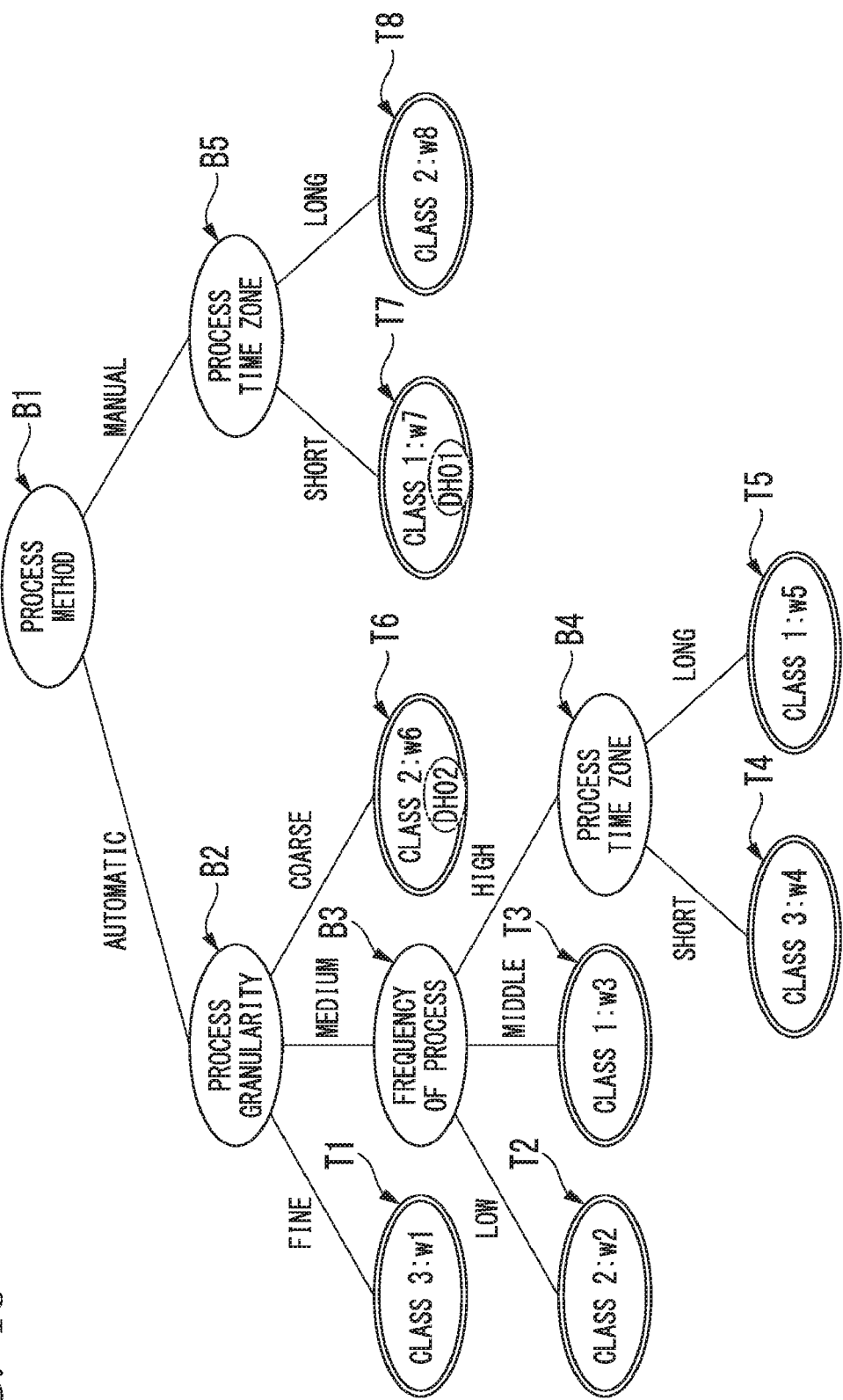
FIG. 18 is a diagram showing an example of a decision tree used in the evaluation stage of the embodiment.

Next, the model application 40 reads conditional models stored in the storage 22 and determines whether or not there is a conditional model applicable to the extracted conditions (step S417). For example, when the set of characteristic data has a characteristic data ID "DH01" shown in FIG. 17, the set of characteristic data reaches a terminal node T7 as shown in FIG. 18. Since a conditional model corresponding to the terminal node T7 is included in the conditional models read from the storage 22, the model applicator 40 determines that there is a conditional model applicable to the extracted conditions. Similarly, when the set of characteristic data has a characteristic data ID "DH02" shown in FIG. 17, the set of characteristic data reaches a terminal node T6 as shown in FIG. 18. Since a conditional model corresponding to the terminal node T6 is included in the conditional models read from the storage 22, the model applicator 40 determines that there is a conditional model applicable to the extracted conditions. On the other hand, for example, in the case of a set of characteristic data in which data other than automatic and manual is associated with the process method in operation label data, there is no matching condition for the set of characteristic data and therefore the model applicator 40 determines that there is no conditional model applicable to the extracted conditions.

Upon determining that there is a conditional model applicable to the extracted conditions, the model applicator 40 substitutes the set of characteristic data generated by the characteristic data generator 32 into the applicable conditional model. And the model applicator 40 calculates at least predictive characteristic data for the conditional model (step S419). For example, for calculating at least predictive characteristic data of first operation label data, the model applicator 40 substitutes a second operation label data into a conditional model. The second operation label data is the remainder of the set of operation label data including the first operation label data. The model applicator 40 may calculate a plurality of predictive characteristic data of respectively operation label data, by substituting each operation label data into a conditional model. Predicted characteristic data corresponding to the conditional model is calculated by calculating such a predictive value for the value of each label.

On the other hand, upon determining that there is no conditional model applicable to the extracted conditions, the model applicator 40 initializes the predictive characteristic data corresponding to the conditional model (step S421). In this case, evaluation using the conditional model is not performed.

Next, the model applicator 40 reads the overall model stored in the storage 22 and substitutes the set of characteristic data generated by the characteristic data generator 32 into the overall model. And model applicator 40 calculates predictive characteristic data for the overall model (step S423). For example, for calculating at least predictive characteristic data of third operation label data, the model applicator 40 substitutes a fourth operation label data into the overall model. The fourth operation label data is the remainder of the set of operation label data including the third operation label data. The model applicator 40 may calculate a plurality of predictive characteristic data of respectively operation label data, by substituting each operation label data into a conditional model. Predictive characteristic data corresponding to the overall model is calculated by calculating such a predicted value for the value of each label.

Next, the state evaluator 42 evaluates a first difference between at least the predicted characteristic data calculated using the conditional models and actual at least the characteristic data. And the state evaluator 42 evaluates a second difference between at least the predicted characteristic data calculated by the overall model and the actual at least the characteristic data. A state of the evaluation target device T is evaluated by combining the first difference and the second difference (step S425). For example, the operating state of the evaluation target device T is evaluated by calculating the first difference and the second difference between at least the predicted characteristic data and at least the characteristic data for each of the conditional models and the overall model. Also, the confidence is accumulated for the first difference of the conditional models, while the value of (1—confidence) is accumulated for the second difference of the overall model. For example, when a value obtained by adding the two accumulated values exceeds a prespecified threshold value, the evaluator 20 determines that there is an abnormality in the evaluation target device T. On the other hand, when the value obtained by adding the two accumulated values is equal to or less than the prespecified threshold value, the evaluator 20 determines that there is no abnormality in the evaluation target device T. That is, the evaluator 20 evaluates the operating state of the evaluation target device T using a conditional model representing a relationship between a first vector and a second vector. The first vector is each of the first operation label data. The second vector is each of the second operation label data that is the remainder of all set of operation label data including the first label data.

An example of an evaluation formula for performing the above evaluation on the set of characteristic data having the characteristic data ID "DH01" shown in FIG. 17 is represented by the following equation (4), and an example of an evaluation formula for performing the above evaluation on the set of characteristic data having the characteristic data ID "DH02" is represented by the following equation (5).

$$D_{DH01} = \qquad \text{equation (4)}$$
$$w7 \sum_{i=1}^{n} |x_{i,DH01} - y_{7i}| + (1-w7) \sum_{i=1}^{n} |x_{i,DH01} - y_{0i}| \leq Th$$

$$D_{DH02} = \qquad \text{equation (5)}$$
$$w6 \sum_{i=1}^{n} |x_{i,DH02} - y_{6i}| + (1-w6) \sum_{i=1}^{n} |x_{i,DH02} - y_{0i}| > Th$$

The variable $y_{0i}$ in equations (4) and (5) is represented by the following equation (6), the variable $y_{7i}$ (as a model of an ith operation label in a conditional model corresponding to the terminal node T7) in equation (4) is represented by the following equation (7), and the variable $y_{6i}$ (as a model of an ith operation label in a conditional model corresponding to the terminal node T6) in equation (5) is represented by the following equation (8).

$$y_{0i} = b_{0i} + \sum_{j=1, j\neq i}^{n} a_{0ij} x_{0ij} \qquad \text{equation (6)}$$

$$y_{7i} = b_{7i} + \sum_{j=1, j\neq i}^{n} a_{7ij} x_{7ij} \qquad \text{equation (7)}$$

$$y_{6i} = b_{6i} + \sum_{j=1, j\neq i}^{n} a_{6ij} x_{6ij} \qquad \text{equation (8)}$$

In the above equations (4) and (5), it is determined that there is no abnormality in the characteristic data item having the characteristic data ID "DH01" which is equal to or less than the threshold value Th and that there is an abnormality in the characteristic data item having the characteristic data ID "DH02" which exceeds the threshold value Th. In the case in which condition selection is not performed, the confidence may be set to 0 and thus the evaluation target device T may be evaluated only with the overall model without considering conditional models.

Next, the state evaluator 42 determines whether or not selection of the plurality of sets of operation data has been completed (step S427). Upon determining that selection of the plurality of sets of operation data has not been completed, the state evaluator 42 performs the process of selecting the set of operation data again (step S405). On the other hand, upon determining that selection of the plurality of sets of operation data has been completed, the state evaluator 42 ends the procedure of this flowchart.

According to at least one embodiment described above, an evaluation device of an embodiment includes a storage, a data generator, a class definer, a characteristic data divider, and an evaluator.

The storage stores a plurality of sets of first data collected for each operation of an evaluation target, each of the set of first data having a time width. The storage stores a plurality of sets of second data including a measured values of the evaluation target obtained by measuring operating states thereof, each of the set of second data being measured within a time width shorter than the time width of the set of first data;

The data generator is configured to generate a set of characteristic data from both a set of first data and at least a set of second data, the set of first data being included in the plurality of sets of first data, the at least set of second data being associated in time information with the set of first data, the at least set of second data being included in the plurality of sets of second data, the set of characteristic data representing a plurality of characteristics;

The class definer is configured to define a plurality of classes for the plurality of sets of characteristic data generated by the data generator;

The characteristic data divider configured to divide the plurality of sets of characteristic data into a plurality of groups on the basis of the plurality of classes defined by the class definer and condition of operations included in the set of first data stored in the storage; and The evaluator is configured to evaluate a operating state of the evaluation target using a first model defined for each of the plurality of groups divided by the characteristic data divider.

In addition, the evaluation device 1 using the models according to the present embodiment can be used to predict measured values of the evaluation target device T or to interpolate missing data of the evaluation target device T.

Some functions of the evaluation device 1 in the above-described embodiments may be realized by a computer. In this case, a program for realizing the functions is recorded on a computer-readable information-recording medium. The functions may then be realized by causing a computer system to read and execute the program recorded on the information-recording medium. The "computer system" referred to here includes an operating system or hardware such as peripheral devices. The "computer-readable information-recording medium" refers to a portable medium, a storage device, or the like. The portable medium is a flexible disk, a magneto-optical disk, a ROM, a CD-ROM, or the like. The storage device is a hard disk provided in the computer system or the like.

The "computer-readable information-recording medium" may be something which dynamically holds a program for a short time, like a communication wire in the case in which the program is transmitted via a communication line. The communication line is a telephone line, a network such as the Internet, or the like. The "computer-readable information-recording medium" may be an internal volatile memory of a computer system serving as a server or a client. The volatile memory holds a program for a certain period of time. The above program may be one for realizing some of the above-described functions. The above program may also be realized by combining the above-described functions with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An evaluation device, comprising:
   a storage storing a plurality of sets of first data collected for each operation of an evaluation target from a plurality of sensors attached to the evaluation target and from status log files from a control computer provided for the evaluation target, each of the sets of first data having both a time width and a condition of an operation, and a plurality of sets of second data including measured values of the evaluation target obtained by measuring operating states thereof, each of the sets of second data being measured within a time width shorter than the time width of the sets of first data; and
   at least one processor configured to execute instructions to:
   generate a set of characteristic data from both a set of first data and at least a set of second data, the set of first data being included in plurality of sets of first data, the at least the set of second data being associated in time information with the set of first data, the at least the set of second data being included in the plurality of sets of second data, the sets of characteristic data representing a plurality of characteristics;
   define a plurality of classes for the generated plurality of sets of characteristic data;
   divide the plurality of sets of characteristic data into a plurality of groups on the basis of the defined plurality of classes and conditions of operations included in the set of first data stored in the storage;
   generate a first conditional model for each one of the plurality of groups, each of the first conditional models corresponding to a combination of conditions of the characteristic data of a respective one of the plurality of groups;
   generate an overall model for all of the plurality of sets of characteristic data considering no combination of conditions of the characteristic data;
   determine whether there is an abnormality in the evaluation target using a value obtained by adding a first accumulated value and a second accumulated value, the first accumulated value being obtained by accumulating first confidences for a first difference between characteristic data predicted using the first conditional models and the characteristic data, and the second accumulated value being obtained by accumulating second confidences for a second difference between characteristic data predicted using the overall model and the characteristic data; and
   store an operating state of the evaluation target, including an indication of the abnormality in the evaluation target, in one of the status log files from the control computer, wherein
   each of the first conditional models includes a plurality of regression models for each label which is included in each one of the plurality of groups, and
   the overall model includes a plurality of regression models for each label which is included in each set of the plurality of sets of the characteristic data.

2. The evaluation device according to claim 1, wherein the at least one processor is configured to execute the instructions to:
   calculate the characteristic data predicted using the first conditional models by applying each of the sets of characteristic data of the respective one of the plurality of groups to a corresponding first conditional model, and
   evaluate the operating state of the evaluation target on the basis of the first difference and the second difference.

3. The evaluation device according to claim 1, wherein each of the characteristic data includes a plurality of characteristic label data representing measured values of the evaluation target by vectors.

4. The evaluation device according to claim 1, wherein each of the first conditional models is a model representing a relationship between the plurality of sets of the characteristic data of the respective one of the plurality of groups.

5. The evaluation device according to claim 1, wherein each of the first conditional models is a model configured to calculate first label data which is included in each set of the plurality of sets of the characteristic data and is explained by second label data that is included in each set of the plurality of sets of the characteristic data except the first label data.

6. An evaluation method, comprising:
   generating, by a computer, a plurality of sets of first data collected for each operation of an evaluation target from a plurality of sensors attached to the evaluation target and from status log files from a control computer provided for the evaluation target, each of the sets of first data having both a time width and a condition of an operation, a plurality of sets of second data including measured values of the evaluation target obtained by measuring operating states thereof, each of the sets of second data being measured within a time width shorter than the time width of the sets of first data, and a set of characteristic data from both a set of first data and at least a set of second data, the set of first data being included in the plurality of sets of first data, the at least the set of second data being associated in time information with the set of first data, the at least the set of second data being included in the plurality of sets of second data, the sets of characteristic data representing a plurality of characteristics;
   defining a plurality of classes for the generated plurality of sets of characteristic data;
   dividing the plurality of sets of characteristic data into a plurality of groups on the basis of the plurality of defined classes and conditions of operations included in the set of first data;
   generating a first conditional model for each one of the plurality of groups, each of the first conditional models corresponding to a combination of conditions of the characteristic data of a respective one of the plurality of groups;
   generating an overall model for all of the plurality of sets of characteristic data considering no combination of conditions of the characteristic data;
   determining whether there is an abnormality in the evaluation target using a value obtained by adding a first accumulated value and a second accumulated value, the first accumulated value being obtained by accumulating first confidences for a first difference between characteristic data predicted using the first conditional models and the characteristic data, and the second accumulated value being obtained by accumulating second confidences for a second difference between characteristic data predicted using the overall model and the characteristic data; and storing an operating state of the evaluation target, including an indication of the abnormality in the evaluation target, in one of the status log files from the control computer, wherein each of the first conditional models includes a plurality of regression models for each label which is included in each one of the plurality of groups, and the overall model includes a plurality of regression models for each label which is included in each set of the plurality of sets of the characteristic data.

7. A non-transitory computer-readable recording medium storing an evaluation program for causing a computer to execute:

generating, by a computer, a plurality of sets of first data collected for each operation of an evaluation target from a plurality of sensors attached to the evaluation target and from status log files from a control computer provided for the evaluation target, each of the sets of first data having both a time width and a condition of an operation, a plurality of sets of second data including a measured values of the evaluation target obtained by measuring operating states thereof, each of the sets of second data being measured within a time width shorter than the time width of the sets of first data, and a set of characteristic data from both a set of first data and at least a set of second data, the set of first data being included in the plurality of sets of first data, the at least the set of second data being associated in time information with the set of first data, the at least the set of second data being included in the plurality of sets of second data, the sets of characteristic data representing a plurality of characteristics;

defining a plurality of classes for the generated plurality of sets of characteristic data;

dividing the plurality of sets of characteristic data into a plurality of groups on the basis of the plurality of defined classes and conditions of operations included in the set of first data;

generating a first conditional model for each one of the plurality of groups, each of the first conditional models corresponding to a combination of conditions of the characteristic data of a respective one of the plurality of groups;

generating an overall model for all of the plurality of sets of characteristic data considering no combination of conditions of the characteristic data;

determining whether there is an abnormality in the evaluation target using a value obtained by adding a first accumulated value and a second accumulated value, the first accumulated value being obtained by accumulating first confidences for a first difference between characteristic data predicted using the first conditional models and the characteristic data, and the second accumulated value being obtained by accumulating second confidences for a second difference between characteristic data predicted using the overall model and the characteristic data; and storing an operating state of the evaluation target, including an indication of the abnormality in the evaluation target, in one of the status log files from the control computer, wherein each of the first conditional models includes a plurality of regression models for each label which is included in each one of the plurality of groups, and the overall model includes a plurality of regression models for each label which is included in each set of the plurality of sets of the characteristic data.

* * * * *